US008600846B2

(12) United States Patent
Lee

(10) Patent No.: US 8,600,846 B2
(45) Date of Patent: Dec. 3, 2013

(54) SYSTEM AND METHOD FOR FINANCIAL TRANSACTION

(75) Inventor: Eun Bok Lee, Anyang-Si (KR)

(73) Assignees: Eun Bok Lee, Gyeonggi-Do (KR); Sung Nam Hong, Gyeonggi-Do (KR)

( * ) Notice: Subject to any disclaimer, the term of this patent is extended or adjusted under 35 U.S.C. 154(b) by 0 days.

(21) Appl. No.: 13/558,169

(22) Filed: Jul. 25, 2012

(65) Prior Publication Data

US 2012/0330800 A1 Dec. 27, 2012

Related U.S. Application Data

(63) Continuation of application No. 12/525,291, filed as application No. PCT/KR2008/001196 on Feb. 29, 2008, now abandoned.

(30) Foreign Application Priority Data

Apr. 25, 2007 (KR) .................. 10-2007-0040415

(51) Int. Cl.
*G06Q 40/00* (2012.01)
(52) U.S. Cl.
USPC .............. 705/30; 705/26.43; 705/43; 705/80; 705/65
(58) Field of Classification Search
USPC ................ 705/30, 26.43, 43, 80, 65
See application file for complete search history.

(56) References Cited

U.S. PATENT DOCUMENTS

| 6,564,192 | B1 * | 5/2003 | Kinney et al. | 705/37 |
| 2002/0069117 | A1 * | 6/2002 | Carothers et al. | 705/26 |
| 2003/0163686 | A1 * | 8/2003 | Ward et al. | 713/156 |
| 2005/0102242 | A1 * | 5/2005 | Omidyar | 705/65 |
| 2008/0097805 | A1 * | 4/2008 | Wells | 705/7 |
| 2008/0313093 | A1 * | 12/2008 | Takahashi et al. | 705/80 |

FOREIGN PATENT DOCUMENTS

| KR | 2002-0041375 A | 6/2002 |
| KR | 2004-0011743 A | 2/2004 |
| KR | 2004-0084346 A | 10/2004 |
| KR | 2004-0099004 A | 11/2004 |

* cited by examiner

*Primary Examiner* — Vanel Frenel
(74) *Attorney, Agent, or Firm* — Rabin & Berdo, P.C.

(57) ABSTRACT

A method and system for a P2P financial transaction can connect to a card company server via a wired/wireless communication network, and a financial card with credit card functions. The method includes closing a first contract involving monetary claim/obligation between members, reporting a first claim amount or a first obligation amount to the card company server, and recording first incoming or first outgoing amounts. The method further includes establishing a second claim amount and a second obligation amount according to a second contract, reporting the second claim amount or the second obligation amount to the card company server, recording second incoming or second outgoing amounts, adding or subtracting respectively to or from the first incoming or the first outgoing amounts, and settling final incoming or outgoing, added or subtracted amounts at regular intervals.

4 Claims, 4 Drawing Sheets

SYSTEM AND METHOD FOR FINANCIAL TRANSACTION

This application claims the benefit under 35 U.S.C. §120 of the earlier filing date of U.S. patent application Ser. No. 12/525,291. U.S. patent application Ser. No. 12/525,291 is the U.S. national phase of international application PCT/KR08/01196 filed Feb. 29, 2008, and claiming the priority of Korean application KR 10-2007-0040415 filed Apr. 25, 2007. Each of the applications identified in the foregoing is fully incorporated herein by reference.

TECHNICAL FIELD

The present invention relates to a financial transaction method and system and a financial transaction card with credit card functionality, and more particularly, to a financial transaction method and system for calculating profit and loss of respective members generated by transactions between members involving monetary claim and obligation by regular accumulative count of each transaction, and to a financial transaction card with credit card functionality therefor.

BACKGROUND ART

On the basis of recent expansion in consumption, rapid increase of economic scale, and expansion of sales network based on information communication technology, consequent to increased individual income, credit provision system arising from consumer credit system has spread rapidly. In Korea, since the first bank credit card was introduced in 1982, use of credit card and credit transactions using the credit cards have rapidly increased.

"Credit Card" is a kind of customer credit, which refers to the whole meaning of a certified payment method issued by the bank to its qualified members. And the credit transaction using this credit card uses the system of the transaction amount is paid in advance by the credit card company and collect it from the members following.

FIG. 1 is a schematic diagram illustrating a typical credit transaction method using a credit card. The credit transaction is made by three entities including a card company 10, a franchisee 20, and a member 30.

The card company 10 issues credit card to the member 30 according to a membership contract and, as a financial organization, makes a separate franchise contract with the franchisee 20, it is the credit extension subject. The member 30, an individual or a corporation possessing the credit card, is a consuming subject. The franchisee 20, as a selling subject, is equipped with a communication terminal capable of checking reference of the member 30 and communicating with the card company 10.

Therefore, when the member 30 presents the credit card after purchasing desired product at the franchisee 20, the franchisee 20 sends a request for credit approval by sending information including the card's proper information, purchase amount, installation period, franchisee ID (Identification) etc to the card company 10. The card company 10 approves or refuses the transaction based on the member 30's personal credit information such as a payment capability. If the transaction is approved, a bill of sales is issued through the terminal. Then the franchisee 20 charges this amount to the card company 10, which after examination pays the purchase amount to the franchisee 20, and collects the amount from the account of the member 30 on the due payment date.

For reference, credit cards in general are classified into a one-party card such as a department store card directly issued by a seller, a two-party card issued by a credit card company that performs credit card business only, and a multi-party card issued by a bank. A Value Added Network (VAN) Service provider may be interposed between the card company 10 and the franchisee 20 for providing additional services, such as a service of relaying transaction approval and billing, and checking abnormal transaction. Therefore, a specific form of transaction may differ from this illustration.

However, a typical credit transaction using a credit card is made between a selling subject, the franchisee 20, and a consuming subject, the member 30, and it cannot be made between the members 30.

Which means, on a premise that a typical credit transaction is made between the franchisee 20, which has independent contract with the card company 10, and the member 30, the franchisee 20 becomes a selling subject and the member 30 becomes a consuming according to the contract. On this account, in a general credit transaction a transaction between members 30, excluding franchisee 20 is in substance impossible. To make this possible, a member 30 who wishes to perform sales must become a selling subject by making a separate franchise contract with the card company.

Meanwhile, with recent increase of the use of internet, electronic commerce (i.e., E-Commerce) has become generalized.

'E-commerce' in goods or service transaction generally refers to transactions that are fully or partially handled in an electronic manner, such as through electronic document exchange. Normally, the E-commerce is made in the form of business to customer (B2C), business to business (B2B), peer to peer (P2P), auction by a seller, or reverse auction by a customer, via websites such as cybermalls or open markets, or internet messenger. The payment is made by the means such as electronic credit transaction using credit card and digital certificate, remittance through an individual's bank account or virtual account, and cyber money.

To give a few examples, Korean Patent Laid-open Publication No. 10-2001-0056939 discloses a wired/wireless e-commerce method by which individuals interconnected by Internet messenger, make payment by means of an electronic payment via financial network after closing contract of transaction. A financial transaction method disclosed in Korean Patent Laid-open Publication No. 10-2003-0047672 introduces method of payment with cyber money after individuals interconnected by a messenger close contract. Another financial transaction system is disclosed in Korean Patent Laid-open Publication No. 10-2001-0082518, which is paying purchase amount by means of electronic money such as cyber money after individuals interconnected by separate P2P system close a transaction contract.

In conventional e-commerce, however, the contact space of a seller and a consumer is limited to on-line websites or Internet messengers, and payment methods have only been substituted by electronic credit transaction, virtual account, and cyber money.

Therefore, there is no substantial difference compared to cash transaction, remittance through bank account, credit card transaction apart from slightly enhanced convenience, but has a drawback that one transaction is completed only when consumer pays purchase amount every transaction to seller and the seller confirms that the purchase amount is collected. Also, there is a high risk where consumer might not receive the purchased product or service after payment because there is no personal contact with the seller, and also a possibility that the purchased product or service is below expected value and find difficulty in negotiating reasonable price, which in this case there is no other solution but to cancel the whole transaction.

Concerning this issue, a method by which individuals make a direct contract with each other and remit purchase amount to a special virtual account-escrow account—was introduced as disclosed in Korean Patent Laid-open Publication No. 10-2005-005550. However, though this method guarantees stable transaction via the escrow, it still requires the procedure of a consumer paying purchase amount every transaction and a seller confirming the payment. Moreover, in recent e-commerce transaction, classifying the subjects role is becoming more and more ambiguous, and the transaction is being diversified from merely a simple product purchase.

Thus, there is a need for a more convenient and safe financial transaction scheme overcoming limitation on credit transaction, and avoiding a risk of e-commerce as well as eliminating the inconvenience of cash transaction or E-commerce.

DISCLOSURE

Technical Problem

An object of the present invention is to provide a scheme capable of guaranteeing convenient and safe financial transaction by eliminating troublesome processes of paying purchase money and confirming receipt of the money every transaction in transactions made between members involving a monetary claim and a monetary obligation.

Another object of the present invention is to provide a financial transaction scheme capable of overcoming limitation on conventional credit transaction by enabling free financial transaction between members, resolving shortcomings of typical cash transaction or E-commerce by eliminating the need for processes of paying purchase money and confirming the payment every transaction, reducing a likelihood of loss even when a seller and a customer have no chance to meet each other directly, and eliminating a risk associated with typical E-commerce transaction by facilitating transaction money adjustment, that is, a financial transaction method and system for calculating profit and loss by each transaction made between members involving monetary claim and obligation and settling it at regular intervals, and a financial transaction card with credit card functionality therefor.

Technical Solution

To achieve the above objective, the present invention, as a P2P financial transaction method between members that can connect to card company server with each members' DBs (databases) via wired/wireless communication network, provides a transaction method including the following level of procedures: (a) the first contract between members A and B involving monetary claim/obligation, and first claim amount and a first obligation amount of the members A and B is established; (b) the first claim amount or the first obligation amount of the member A is reported to the card company server, and first incoming (+) or first outgoing (−) is recorded in member A's DB; (c) the second claim amount and the $2^{nd}$ obligation amount of members A and C is established according to second contract between the members A and C involving monetary claim/obligation; (d) the second claim amount or the second obligation amount of the member A is reported to the card company server and recorded as second incomings (+) or second outgoings (−) in member A's DB, and is settled with the first incomings (+) or the first outgoings (e) the final incomings or outgoings added or subtracted in the DB for member A is settled by regular periods.

The above step (b) includes the procedure of the first claim amount or the first obligation amount of the member B being sent to the card company server and recorded as the first income (+) or the first payment (−) in the member B's DB, and the above step (e) includes settling final income or payment added or subtracted in the DB for the member B by regular periods. The step (b) may further include the following 3 procedures: (b1) the first payment of the member A—the purchaser—is recorded in the member A's DB; (b2) completion of duty of the member B as the seller; (b3) the first income of the member B is recorded in the member B's DB.

The above step (d) may further include reporting the second claim amount or the second obligation amount of the member C to the card company server, and recording it as the second incomings (+) or the second outgoings (−) in the member C's DB. The step (e) may further include settling final incomings or outgoings added or subtracted in the member C's DB by regular periods. The step (d) may further include the following three procedures: (d1) the first payment of the member A—the purchaser between members A and C—is recorded in the member A's DB; (d2) duty of the member C—as the seller between member A and C—is completed; and (d3) the first incomings of the member C is recorded in the member C's DB. Also, the above step (b) may further include procedures such as payment of the first obligation amount of member B as an obligor between member A and B, using member B's credit card and the step (d) may further include payment of the second obligation amount of the member C as an obligor out of the member A and C using member C's credit card. Additionally the settlement in the step (e) may include payment of incomings and charging outgoings or carry forward of incomings and outgoings. The step (b) may further include reporting transaction details referring to the first contract to the card company server. The step (d) may further include reporting transaction details referring to the second contract to the card company server and the mentioned transaction details may include specified contract parties, type of contract, and performance of contract.

After the above step (b), procedure of adjusting the first claim amount and the first obligation amount under agreement between the members A and B, and updating the first incomings and the first outgoings recorded in the DBs of members A and B accordingly, will be added. And after step (d), additional step of adjusting the second claim amount and the second obligation amount under an agreement between the members A and C, and updating the second incomings and the second outgoings recorded in the DBs of the members A and C accordingly will be proceeded. The agreement between the members may be defined as decrease in the amount, an increase in the amount or termination of contract.

To make all the above transactions possible, this invention provides financial card with credit card functions containing each of the above members' ID.

It also provides, as a financial transaction system for P2P transactions among members accompanying monetary claim/obligation, member management DB recording each members' personal information, P2P transaction DB recording P2P transactions made among the members, member' individual P2P DB recording accumulative addition or subtraction of each members' incomings and outgoings, P2P settlement DB recording each members' detailed settlement, and P2P server that can be interconnected by the members by wired/wireless communication network and that is synchronized among the above P2P member management DB, P2P transaction DB, members' individual P2P DB and P2P settlement DB.

The above P2P server may store and update P2P transaction details received from the member in the P2P transaction DB, store and update accumulative settlement after addition or subtraction of incomings and outgoings of each member based on claimed amount and obligation amount of each P2P transaction received from the member, record each member's final accumulative settlement of incomings and outgoings by regular periods. The system may further include a web server synchronized with the P2P server; and a webpage for notifying the P2P transaction details between the members, incomings and outgoings resulting from the P2P transaction between the members, and settlement details for each member via the web server.

The system also includes a credit transaction server that is connected to the franchisee and synchronized with the P2P server to process the transactions made between members and franchisees.

Advantageous Effects

As described above, the financial transaction scheme according to the present invention guarantees convenient and safe financial transactions between members involving monetary claim and monetary obligation in all forms, without the need to pay purchase money and confirm payment for each and every transaction.

Therefore, this invention not only overcomes the limit of conventional credit transaction as it becomes possible for free financial transaction between members and resolves shortcomings of typical cash transaction or E-commerce by eliminating the need for processes of paying purchase money and confirming receipt of the money every transaction, but also it has advantages of reducing general risk in e-commerce by making it easier to settle on the amount of transaction between seller and consumer without personal contact.

* Description of Major Symbols in the above Figures

| 50: Credit transaction service | 52: Card company |
| 54: Franchisee | 56, 58, 64: Member |
| 60: P2P transaction | 62: Wired/wireless communication network |

BEST MODE

Hereinafter, present invention will be elaborate in detail with reference to the attached drawings. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

Figure 1:
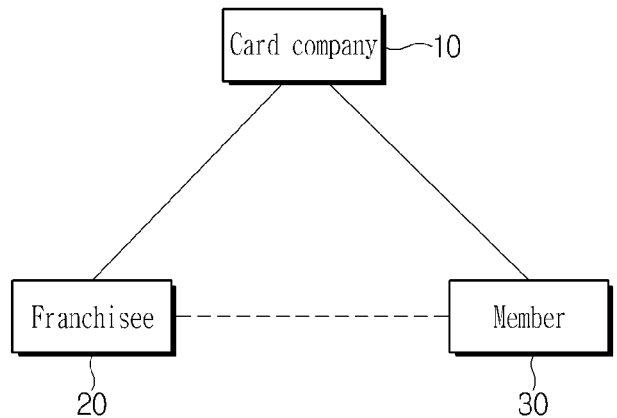
FIG. 1 is a schematic diagram illustrating a typical credit transaction method.
Figure 2:
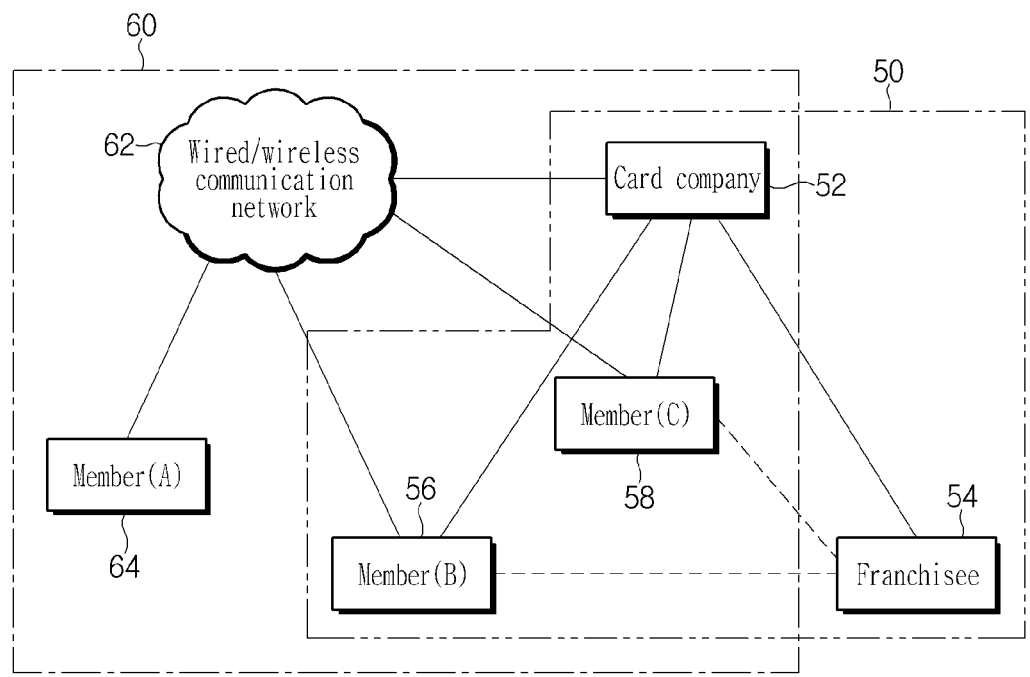
FIG. 2 is a schematic diagram illustrating a financial transaction method according to the present invention.

FIG. 2 is a schematic diagram illustrating a financial transaction method according to the present invention.

As shown in FIG. 2, a financial transaction method according to the present invention may include a credit transaction service 50 for credit card transaction and P2P transaction 60 for P2P transaction among members 56, 58, and 64. The members 56, 58, and 64 are classified into members 56 and 58 capable of credit transaction, and members 56, 58, and 64 capable of P2P transaction. All of the members 56, 58, and 64 can perform a P2P transaction, but a sole member who cannot carry out credit card transaction—member 64—an be included.

For convenience, members are indicated by reference numerals 56, 58, and 64.

First, the credit transaction 50 is carried out by three subjects including a card company 52, a franchisee 54, and the members 56 and 58.

The card company 52 issues credit card according to member contract with the members 56 and 58 and, as a credit extension subject it makes a separate franchise contract with the franchisee 54. The card company 52 may be a department store, a credit card company, or a financial organization such as a bank. The members 56 and 58, as individuals or corporations possessing a credit card, are consuming subjects in case of credit transaction 50. The franchisee 54 is a selling subject in the credit transaction 50, and is equipped with a terminal capable of reading the credit cards of the members 56 and 58 and communicating with the card company 52.

If necessary, a relaying agency such as a VAN service provider may appear between the card company 52 and the franchisee 54 for providing several additional services. The credit card possessed by the members 56 and 58 may be a one-party card, a two-party card, or a multi-party card. The card company 52 may be a single or a group of card companies cooperating with one another, and so is the franchisee 54.

Therefore, a credit transaction is usually formed by the card company 52 making prepayment of purchase amount for the members 56 and 58 to the franchisee 54, and collecting the amount afterwards from the members 56 and 58, though it may vary case by case.

For example, when the members 56 and 58 present the credit card to purchase a product at the franchisee 54, the franchisee 54 transmits a request for approval to the card company 52 through the terminal, in which it contains proper card information, purchase amount, an installation period, franchisee ID and etc. The card company 52 approves or refuses the transaction based on members' credit information such as a payment capability of the members 56 and 58. When the transaction is approved, sales check is issued through the terminal of the franchisee 54. Then, when the franchisee 54 charges the card company 52 the purchase amount, the card company 52 examines the transaction and pays the purchase amount to the franchisee, and collects the purchase amount from the account of the members 56 and 58 on a due payment date.

However, free P2P transaction among the members 56, 58, and 64 is limited because the credit transaction 50 is based on selling by the franchisee 54 and consumption by the members 56 and 58.

Accordingly, the present invention provides the P2P transaction 60 that allows all types of P2P transactions among the members 56, 58, and 64 involving monetary claim and monetary obligation, and it includes calculating accumulative gain and loss of the respective members 56, 58, and 64 by every transaction among the members 56, 58, and 64, and settling the gain and loss at regular intervals.

The P2P transaction 60 is made by the card company 52 and two or more members 56, 58, and 64 capable of accessing the card company 52 via a wired/wireless communication network 62, as the main transaction subjects.

Now the card company 52 may make a separate P2P contract with the members 56, 58, and 64, and issue a financial transaction card with credit card function for P2P transaction or assign a member ID to the respective members 56, 58, and 64 by other tangible or intangible medium. And these members 56, 58, and 64 may freely change the role of being a selling subject or a consuming subject according to each transaction contract, being an individual or corporation that has made a P2P contract with the card company 52. The P2P contract may include articles about limit of P2P transaction amount and P2P settlement date, and the credit card member contract may be invoked. Wired/wireless communication network 62 may include Internet and a wired/wireless telephone network.

Figure 3:
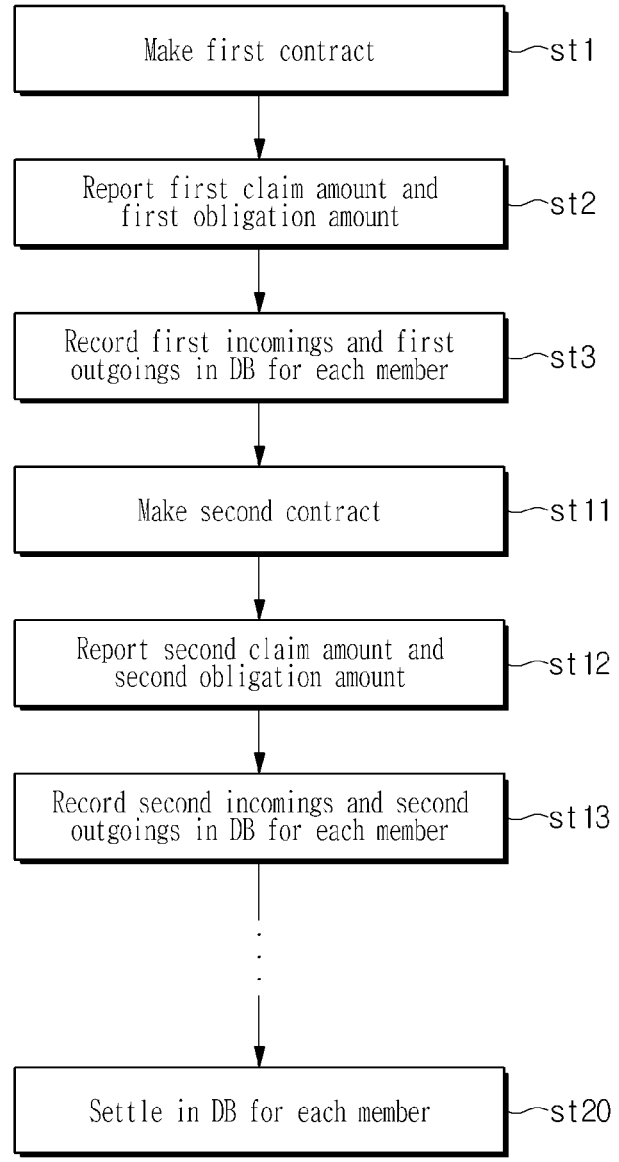
FIG. 3 is a flowchart illustrating a financial transaction method according to the present invention.

FIG. 3 is a flowchart illustrating a P2P transaction method using the P2P transaction 60 according to the present invention. It is referred to with the previous FIG. 2.

P2P transaction according to the present invention begins with the first contract involving monetary claim and monetary obligation among the members 56, 58, and 64 (st1).

In this case, the first contract may be closed through the card company 52 and for this first contract the card company 52 may provide a website or an Internet messenger system that can enable the members 56, 58, and 64 to access the card company 52 and make contract with the counterpart. The first contract includes all form of contract previously mentioned involving monetary claim and monetary obligation, and as a bilateral legal contract suggested in a civil law, it includes any free contract such as donation, trade, exchange (limiting to one involving supplement money), expenditure loan (non-gratuitous), use loan (non-gratuitous), lease (non-gratuitous), employment, contract for work, advertisement for prize contest, delegation (non-gratuitous), bailment (non-gratuitous), combination, life annuity, and compromise (non-gratuitous).

Supposing a case of product transaction between member A 64 and member B 56 as a typical example of a trade contract for ease of illustration, monetary claim and obligation, and performance claim and obligation are imposed to both, member A 64 and member B 56, according to the first contract. That is, if the first contract is a sales contract of the member A 64 purchasing product X priced at 5,000 Won from the member B 56, the member B 56 has a monetary claim of 5,000 Won against the member A 64 and performance obligation to deliver product X to the member A 64, while the member A 64 has a monetary obligation of 5,000 Won against the member B 56 and a performance claim to receive product X from the member B 56.

Accordingly, the member A 64 and the member B 56 resolve the performance claim and the performance obligation by performing the transaction, during which a claim amount and an obligation amount such as price of the product and shipping charge are settled. Settling the claim amount and the obligation amount is a factum resulting from an agreement between the member A 64 and the member B 56.

After the claim amount and the obligation amount are settled, the member A 64 and the member B 56 report the claim amount and the obligation amount to the card company 52 (st2).

Transmission of the claim amount and the obligation amount to the card company 52 requires an agreement between both parties, and if this transmission is done through a website or an internet messenger provided by the card company, it may include the procedure of checking authenticity of the agreement, such as appending a digital signature of the member A 64 and the member B 56. In step st2, the member A 64 and the member B 56 may also send transaction details of the first contract to the card company 52, which may include specified contract subjects, i.e., the member A 64 and the member B 56, type of contract, performance of contract and etc. These details also require an agreement between both parties including a procedure of checking authenticity of the agreement.

The card company 52 records the obligation amount of the member A 64 and the claim amount of the member B 56, as gain and loss i.e. a first income (+) and a first payment (−), in a P2P DB of each member (st3).

That is, the card company 52 may record the first outgoings of −5,000 Won in the P2P DB for the member A 64, and record the first incomings of +5,000 Won in the P2P DB for the member B 56.

Accordingly, the first contract between the member A 64 and the member B 56 is terminated. Meanwhile, after the first claim amount and the first obligation amount are reported to the card company 52, content of the first contract may be modified under an agreement between the member A 64 and the member B 56. If the adjustment is regarding the first claim amount and the first obligation amount due to decrease or increase in the purchase amount, or void of contract, the member A 64 and the member B 56 may report the adjusted first claim amount and the first obligation amount under the agreement, to the card company 52. The card company 52 determines the authenticity of the agreement and corrects and updates the first outgoings recorded in the P2P DB for the member A 64 and the first incomings recorded in the P2P DB for the member B 56.

Subsequently, a second contract among the members 56, 58, and 64 that involves monetary claim and monetary obligation is closed (st11).

Supposing member A 64 engages to sell his/her product Y priced at 7,000 Won to member C 58, as an example, the member A 64 has a monetary claim of 7,000 Won and a performance obligation to deliver product Y to the member C 58, and the member C 58 has a monetary obligation of 7,000 Won and a performance claim to receive product Y from the member A 64.

The performance is completed by the member A 64 delivering product Y to the member C 58, and the member A 64 and the member C 58 settle second claim amount and second obligation amount resulting from the second contract and report the numbers to the card company 52 (st12). Transaction details for the second contract may also be sent herewith.

Subsequently the card company 52 records incoming of +7,000 Won in the P2P DB of the member A 64 and an outgoing of −7,000 Won in the P2P DB of the member C 58. But since the outgoing of −5,000 Won was recorded in the previous P2P DB of the member A 64 bound by contract described above, the card company 52 adds or subtracts the incomings or outgoings bound to current contract to or from the incomings or outgoings bound by the previous contract, and records the result in the DBs of the respective members. Therefore, the incoming of +2000 is finally recorded in the P2P DB for the member A 64 (st13).

Here, after sending the second claim amount and the second obligation amount to the card company 52, the member A 64 and the member C 58 may modify the contract under a mutual agreement. If the second claim amount and the second obligation amount are modified, the member A 64 and the member C 58 report the second claim amount and the second obligation amount, newly adjusted according to the agreement, to the card company 52, and the card company 52 determines the authenticity of the agreement, and modifies and updates the second incomings recorded in the P2P DB for the member A 64 and the second outgoings recorded in the P2P DB for the member C 58.

Meanwhile, the process described above can be freely performed according to the contract among the members 56, 58, and 64, and the card company 52 adds or subtracts the incomings or outgoings in the P2P DB of the members 56, 58, and 64 by each transaction. If a total incomings or outgoings of the members 56, 58, and 64, exceeds limit of the P2P transaction, the card company 52 may inform the members 56, 58, and 64 and may no longer approve further financial transaction.

After a certain period of time, on due payment date of P2P transaction of the members 56, 58, and 64, the card company 52 settles the final incomings or outgoings recorded in the P2P DB of the members 56, 58, and 64. In case of incomings, the card company 52 pays the incomings (+) to the members 56, 58, and 64 or carries forward to a next period, and in case of outgoings, the members 56, 58, and 64 pay the outgoings (−) to the card company 52 or carry forward to the next period, and hereby completes the settlement.

The settlement details may be sent to the members 56, 58, and 64.

Figure 4:
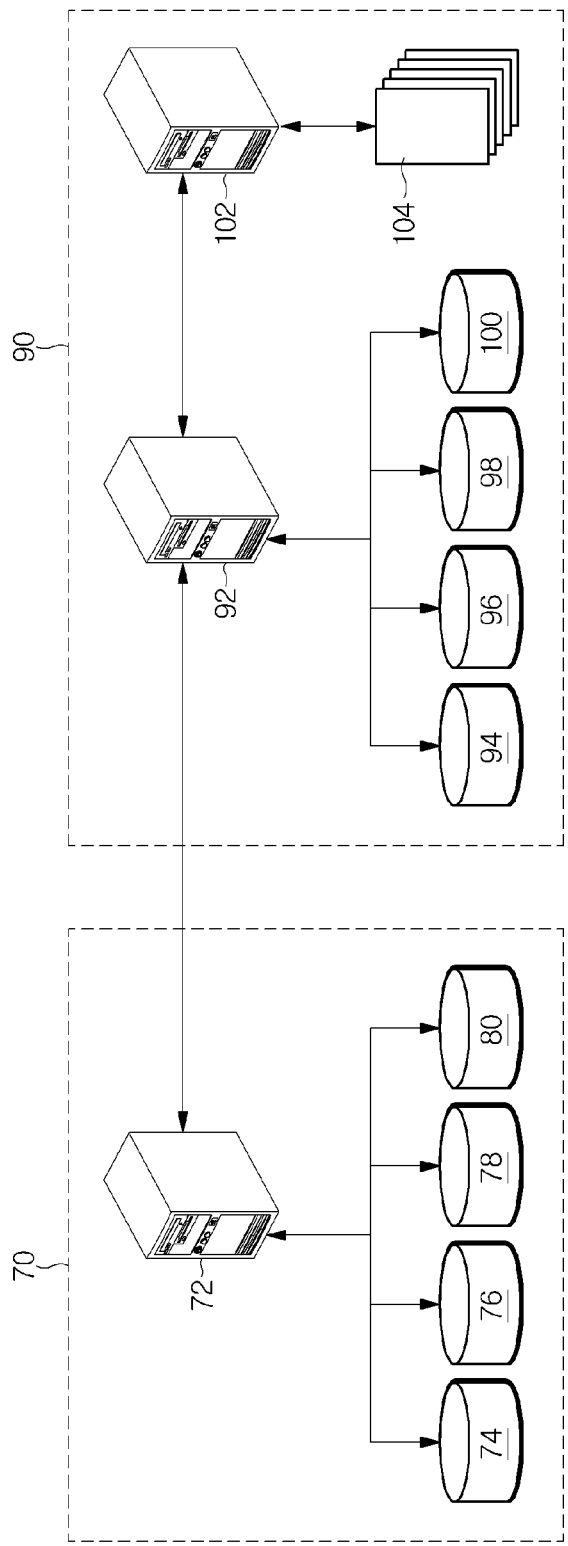
FIG. 4 is a block diagram illustrating a financial transaction system according to the present invention.

FIG. 4 is a block diagram illustrating a financial transaction system according to the present invention. The financial transaction system may include a credit transaction service unit 70 and a P2P transaction service unit 90 that are interconnected with each other.

First, the credit transaction service unit 70 includes a credit transaction server 72 to which the terminal for the franchisee 54 is connected, and a plurality of credit transaction DBs that cooperate with the credit transaction server 72, such as a credit member management DB 74 for storing information on credit card members, a franchisee DB 76 for storing information on the franchisee 54, a transaction approval DB 78 for storing a request for approval from the franchisee 54 and the result of the request, and a credit settlement DB 80 for storing details of a purchase money request from the franchisee 54, a purchase money payment, and purchase money recovered from the member.

Accordingly, when a request for approval is transmitted to the credit transaction server 72 through the terminal of the franchisee 54, the credit transaction server 72 determines whether the credit transaction is valid based on proper card information stored in the credit member management DB 74 such as payment capability of the member and franchisee information stored in the franchisee DB 76, and then draws up the result of the request for approval, stores the result in the approval DB 78, and replies the result to the franchisee 54. Upon transmission of charge for purchase amount, the credit transaction server 72 examines the request, stores the same in the settlement DB 80, and reflects the details of payment of purchase money and purchase money received from the member on the payment date. It will be easily understood by those skilled in the art that the forgoing is illustrative and the present invention is not limited thereto.

Meanwhile, the P2P transaction service unit 90 includes a P2P server 92, and a plurality of P2P DBs cooperating with the P2P server 92, such as a P2P member management DB 94 for storing member information for P2P members who have made a P2P contract, a P2P transaction DB 96 for storing P2P transaction details between the P2P members, a P2P DB 98 for storing added and subtracted income and payment resulting from P2P transaction between members, and a P2P settlement DB 100 for storing settlement details of the respective members.

Therefore, the P2P server 92 stores and updates P2P transaction details received from the member in the P2P transaction DB, adds or subtracts the incomings and outgoings in the P2P DBs of the members based on claim amount and an obligation amount every P2P transaction reported by the member, settles final incomings and outgoings added or subtracted in the P2P DBs of the members at regular intervals, and records the same in the P2P settlement DB. Preferably, the P2P transaction service unit 90 may further include a web server 102 interconnected to the P2P server 92 to provide a website 104 accessible to a user, in which the website presents a list of products for transaction owned by the members. Accordingly, the members can log into the website 104 of the card company 52 to make a P2P transaction with the other members, and use the website 104 to send claim amount, obligation amount, and transaction details to the P2P server 92.

Although not shown on the diagram, the P2P transaction service unit 90 may further include a messenger server interconnected with the P2P server and accessible to a user. The members may use the messenger server to make a P2P transaction with the other members and send claim amount, obligation amount, and transaction details to the P2P server 92.

Several examples of the P2P transaction according to the present invention will now be described.

A first example is fund raising in which performance between members is unnecessary and FIG. 3 can be referred to for this case.

The fund raising is used in a broad sense including donation, deposition, life annuity etc, and it includes all transaction whether direct performance against a monetary claim and a monetary obligation is not produced or produced with a time difference.

First, a contract is closed among the members 56, 58, and 64 (st1 or st11).

Accordingly, member A 64 has a monetary obligation to pay raised money to the member B 56, and the member B 56 has a monetary claim to receive the raised money from the member A 64, and there are no performance claim or performance obligation between the member A 64 and the member B 56.

The member A 64 and the member B 56 then settle the claim amount and the obligation amount under mutual agreement, and report it to the card company 52 (st2 or st12). Transaction details, if required, may be sent together, and depending on the form of fund raising, the member A 64 may independently send the obligation amount and/or the transaction details to the card company 52.

The card company 52, records outgoings resulting from the obligation amount in the P2P DB for the member A 64, and records incomings resulting from the claim amount in the P2P DB for the member B 56 (st3 or st13).

Accordingly, the fund raising contract between the member A 64 and the member B 56 is completed.

Another form of a contract can be one in which member A 64 requests member B 56 to perform a specific activity. The following, as an example, is a contract for work where member A 64 engages to compensate member 56 for drawing a portrait. A contract for work generally refers to a contract that becomes effective by a party engaging to complete a certain work, and a counterpart engaging to compensate for the work, and it generally includes contract of employment, service transaction, and delegation.

First a contract is closed among the members 56, 58, and 64, and supposedly member A 64 has a monetary obligation corresponding to compensating member B 56 and a performance claim to receive a finished portrait, and the member B 56 has a performance obligation to draw and deliver the portrait to the member A 64 and a monetary claim for compensation (st1 or st11).

Accordingly, the member B 56 draws and delivers the portrait to the member A 64, thereby completing the duty.

The member A 64 and the member B 56 settle on the claim amount and the obligation amount, and report to the card company 52 (st2 or st12). And it is natural that transaction details can be reported together.

The card company 52 records an outgoing resulting from the obligation amount in the P2P DB for the member A 64, and records an incoming resulting from the claim amount in the P2P DB for the member B 56 (st3 or st13).

Accordingly, the contract for work between the member A 64 and the member B 56 is completed.

Figure 5:
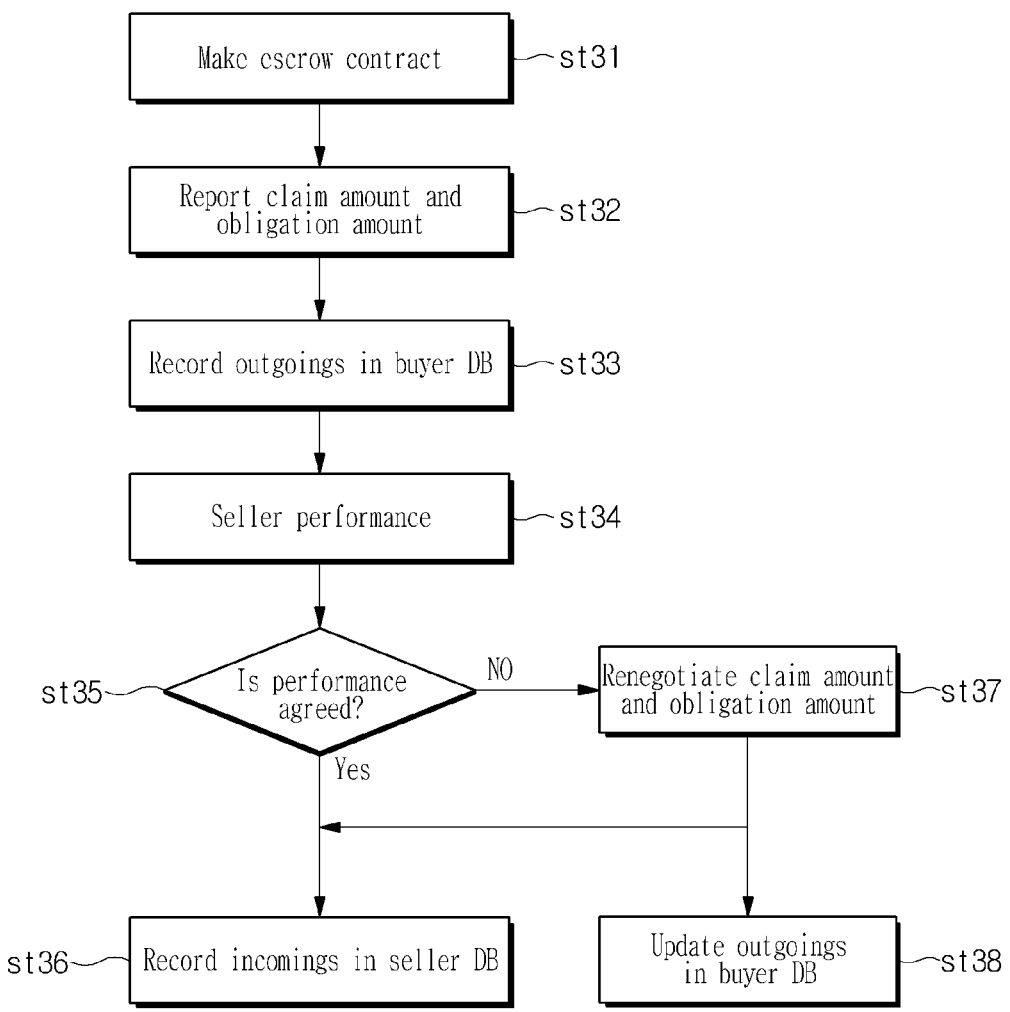
FIG. 5 is a flowchart illustrating an example of a financial transaction method according to the present invention.

As a final example, an escrow contract will now be described in detail with reference to FIG. 5.

A term 'escrow' refers to a sales contract called 'a system for deposit of money after product delivery', in which after a consumer orders a product, sends purchase money to a third party, and confirms receipt of the product, and only then the third party pays the purchase money to a seller. In P2P transaction according to the present invention, the card company 52 becomes the third party.

First, suppose that members A 64 and B 56 close a contract for product transaction and agree to escrow (st31). For convenience, assuming that the member A 64 purchases product Z priced at 10,000 Won from the member B 56, the member A 64 has a monetary obligation of 10,000 Won, and the member B 56 has a monetary claim of 10,000 Won.

The members A 64 and B 56 then report transaction details including a claim amount, an obligation amount, and an agreement on escrow to the card company 52 (st32).

The card company 52 then records an outgoing of 10,000 won in the P2P DB for the member A 64 (st33).

The member B 56 then delivers product Z to the member A 64 and thereby completes the duty (st34).

If the member A 64 does not have any objection about the performance of the member B 56, notifies the card company 52 of the completion of duty. The card company 52 then records income of +10,000 Won in the P2P DB for the member B 56. On the other hand, if the member A 64 has any objection about the product purchase amount, a new claim amount and obligation amount are settled under agreement between the members A 64 and B 56, and reported to the card company 52 (st37).

The card company 52 then modifies the outgoing recorded in the P2P DB for the member A 64, and records incoming resulting from the modified claim amount in the P2P DB for the member B 56 in response upon notification of performance completion from the member A 64 (st38).

The escrow-based transaction using the financial transaction method according to the present invention is thereby completed.

Although the foregoing is based on all members 56, 58, and 64 making the P2P transaction, it may also be carried out side by side with credit card transaction.

That is, referring back to FIG. 2, it is a case where member A 64 incapable of credit card transaction as a monetary claimer makes a transaction with member B 56 or member C 58 capable of credit card transaction, in which the member B 56 or the member C 58 as a monetary obligor pays his/her obligation amount using a credit card, and the claim amount is recorded as incomings in the P2P DB for the member A 64. The obligation amount is charged to the member B 56 or the member C 58 according to a typical procedure of credit transaction using a credit card.

In the P2P transaction according to the present invention, in case the claim amount and an obligation amount are changed after concerning settlement period is over, the change may be carried over to the next period, and this will be easily understood by those related.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A financial transaction system for a plurality of financial transactions between members whose position can be freely changed between consuming subject and selling subject according to a contract including settling on a claim amount and an obligation amount resulting from a closed contract and performing the contract, the system comprising:
   a member management DB for storing member information for member authentication;
   a P2P transaction DB for storing transaction details according to the contract between the members;
   P2P DBs for each member in which a claim amount and an obligation amount according to the contract between the members are added or subtracted and recorded as incomings and outgoings;
   a P2P settlement DB in which final incomings and outgoings are recorded, which are calculated by addition or subtraction in the P2P DBs at regular intervals;
   a terminal used by the members; and
   a P2P server connected to the terminal via a wired/wireless communication network, and interconnected to the member management DB, the P2P transaction DB, the P2P DBs for the respective members, and the P2P settlement DB, wherein the P2P server adds or subtracts and records the claim amount and obligation amount received from the terminal as incomings and outgoings in the P2P DBs, records details of the contract from the terminal in the transaction DB, and records final incomings or outgoings in the P2P settlement DB, the final incomings or outgoings being calculated by the addition or subtraction between the members whose position has been changed more than once between consuming subject and selling subject according to the contract in the P2P DBs at regular intervals of time period,
   wherein the P2P server adjusts the final incomings or outgoings stored in the P2P settlement DB, when receiving a request for an adjustment of the claim amount and the obligation amount according to the contract.

2. The system of claim 1, wherein the wired/wireless communication network comprises at least one of the Internet and a wired/wireless telephone network.

3. The system of claim 1, further comprising a web server interconnected to the P2P server for providing a webpage, the webpage presenting the transaction details, the incomings and outgoings, and the final incomings and outgoings.

4. The system of claim 1, wherein:
   the members include a first member, a second member and a third member;
   the position of the first member changes between consuming subject and selling subject, such that the P2P server recognizes the first member as consuming subject when the first member has an obligation amount to be paid to the second member, and the P2P server recognizes the first member as selling subject when the first member has a claim amount to be paid from the third member; and the P2P server adds the claim amount of the first member and subtracts the obligation amount of the first member, to calculate and record the final incomings or outgoings of the first member.

\* \* \* \* \*